Sept. 26, 1950　　　　　J. BAUER ET AL　　　　　2,523,551
GAUGE
Filed Feb. 28, 1947
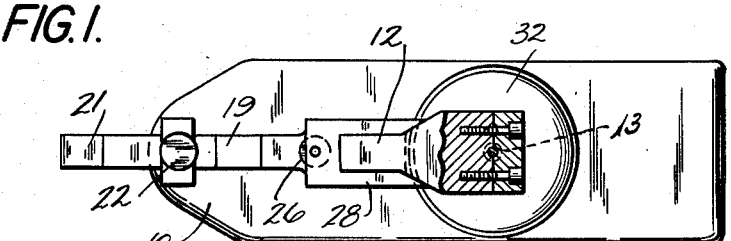
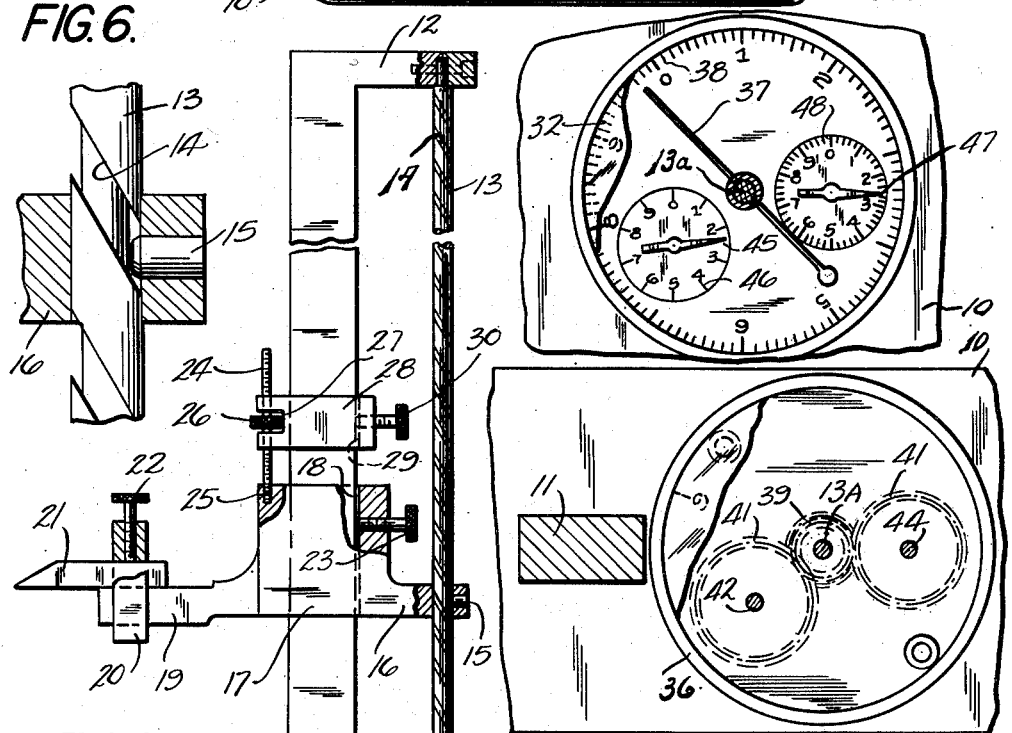
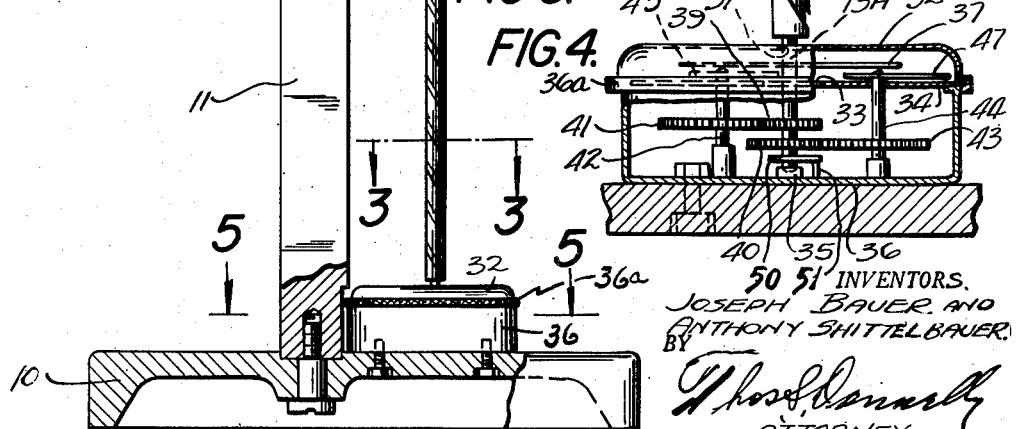
INVENTORS.
JOSEPH BAUER AND
ANTHONY SHITTELBAUER
BY
Thos L Donnelly
ATTORNEY.

Patented Sept. 26, 1950

2,523,551

UNITED STATES PATENT OFFICE 2,523,551

GAUGE

Joseph Bauer and Anthony Schittelbauer, Detroit, Mich.

Application February 28, 1947, Serial No. 731,482

2 Claims. (Cl. 33—172)

Our invention relates to a new and useful improvement in a gauge adapted for use in indicating dimensions and measuring various objects. The invention lends itself admirably for use as a caliper, height gauge, or the like.

It is an object of the invention to provide a gauge having a contacting finger for measuring distances when moved longitudinally along an actuating mechanism and having means for indicating the degree of longitudinal movement.

Another object of the invention is the provision of a gauge of this class which will be simple in structure, economical of manufacture, durable, compact, accurate, and highly efficient in use.

Another object of the invention is the provision of a measuring carriage slidably mounted on a bar or supporting standard and in contact with a helically grooved shaft or helix screw which extends parallel with the supporting standard so that the degree of longitudinal movement of the carriage on the supporting standard will be indicated, through a rotation of the shaft, by an indicating gauge.

Another object of the invention is the provision of a gauge in which the carriage is slidably mounted on a supporting bar and so arranged that it may be moved longitudinally thereof to a pre-determined distance and then moved gradually by a fine adjustment means from such pre-determined distance.

Other objects will appear hereinafter.

It is recognized that various modifications and changes may be made in the detail of structure illustrated without departing from the invention itself and it is intended that such shall be embraced within the scope of the claims which form a part hereof.

Forming a part of this specification are drawings in which,

Fig. 1 is a top plan view of the invention with parts broken away and parts shown in section, Fig. 2 is a side elevational view of the invention with parts broken away and parts shown in section, Fig. 3 is a sectional view taken on line 3—3 of Fig. 2, Fig. 4 is a side elevational view of the indicating gauge used in the present invention with parts broken away and parts shown in section, Fig. 5 is a fragmentary, sectional view taken on line 5—5 of Fig. 2, Fig. 6 is an enlarged, fragmentary view of the invention showing the helix screw and follower.

While the invention is adapted for use as a measuring instrument for various measuring operations, in the drawings we have indicated it applied to a height gauge. In the drawings, we have indicated a base 10 to which is secured, to project upwardly therefrom, a bar or standard 11 having at its upper end a laterally projected head 12. Journaled in the head 12 is one end of the shaft 13 which extends in spaced parallel relation to the bar or standard 11. The shaft 13 is provided with a helical groove 14 that extends throughout the major length of the shaft 13 forming a helix lead screw. Engaging in the groove 14 and adapted to follow the course of the groove is a follower or pin 15 secured in the arm 16 that extends outwardly from the carriage 17. The carriage 17 is provided with an opening 18 through which the bar or standard 11 may be projected. Carried by the carriage 17 is a screw 23 adapted to engage against the bar or standard 11 for locking in fixed relation on the standard 11 the carriage 17. Extended from the carriage 17 is an arm 19 to which is secured by the band 20 a finger or pointer 21. A set screw 22 threaded through the band 20 serves to press the finger 21 in fixed relation to the arm 19. Secured by pin 25 to the carriage 17 is a threaded shaft 24 which projects through a slot 27 formed in a sleeve 28. Threadable on the shaft 24 is a nut 26 which is located within the slot 27. The sleeve 28 is provided with an opening 29 that extends therethrough and through which the bar or standard 11 is slidably projected. Threaded in the sleeve 30 to engage the standard 11 is a screw 30 which is adapted to lock the sleeve 28 in fixed relation on the standard 11.

A lower end of the grooved shaft or lead screw 13 is provided with a reduced shaft section 13a which projects through opening 31 of the transparent closure 32 and through opening 33 of a dial plate 34 into the housing 36 of an indicating gauge to be journaled in the bearing 35 therein. The transparent closure 32 and the dial plate 34 are secured by a ring 36a to the housing 36. Secured for rotation with the shaft 13a is an indicator 37 for reading with the markings and numerals 38 scribed on and arranged around the marginal edge of the dial plate 34. Secured on the shaft 13a are the gears 39 and 40, the gear 39 meshing with the gear 41 for rotating the shaft 42, the gear 40 meshes with the gear 43 for rotating the shaft 44. Secured on the shaft 42 is an indicator 45 adapted to be read with the markings and numerals 46 on the dial plate. Secured on the end of the shaft 44 is an indicator 47 which is read with the markings and numerals 48 scribed on the dial plate 44.

In use, the set screws 23 and 30 are loosened and the carriage 17 and sleeve 28 would be slid longitudinally of the standard to approximately the distance desired and this distance of slidable movement will be indicated on the dial by a reading from the pointer 47. The pointer 47 being rotated through the rotation of the helix lead screw 13 effected by the pin 15 carried longitudinally of the shaft by the carriage and effecting a rotation of the shaft in following the groove 14. The rotation of the helix screw also has moved the pointers 37 and 45 so that a reading of all of the dials will give a dimensional reading from a fixed point or surface, in the drawings from the surface upon which rest the base 10, to the movable pointer 21. A reading of the marking 48 indicated by the pointer 47 will give an inch dimension reading, while a reading from the pointer 45 and 37 will give a decimal dimension which are the fractional parts of an inch. For example, as shown in the drawing, the pointer 47 indicates that the height of the object is greater than 2 inches and by a reading from the pointer 45, the decimal dimension would be read as something greater than .200 and referring to the pointer 37 would indicate that the decimal dimension there is .097. Consolidating the readings of all three of the pointers, the dimension would read as 2.297. To accurately determine the dimension read from the pointers 45 and 37, the operator would first, after the proper height had been approximately reached by the pointer 21, thread the set screw 30 so as to securely lock the sleeve 28 in fixed, relative position on the standard 11 and by rotating the nut 26 will axially move the threaded shaft 24 for moving the carriage on the bar or standard 11. By rotation of the nut 26, a fine adjustment or movement of the pointer 21 may be effected and thereby provide an accurate dimensional reading.

One end of a coil spring 50 is attached to the shaft 13a and the opposite end is secured to a stud 51 secured to casing 36. The spring 50 acts as a back lash spring for the grooved shaft or lead screw 13 resisting rotation in one direction so that the pin 15 bears against one side of the groove 14 and the tension of the spring on the shaft also tends to hold the pointers steady eliminating jiggling or wobbling, permitting a more accurate reading.

With a gauge constructed in this manner, the movement of the contacting finger 21 longitudinally of the standard 11 is directly indicated on the dial by virtue of the follower 15 riding in the grooves 14 to effect a rotation of the shaft 13. Thus, wherever the carriage 17 is stopped, there will result a reading on the dial. Taking a reading each time the carriage is halted will give the operator a series of successive readings from which he may compute the various lengths relative to each other or the dimensional differences between the lengths. As the reading may be had irrespective of which direction the carriage is moved along the standard 11, there is thus provided to the operator a means for quickly determining the height or length of the object, or the distance of a point relative to other points of the object. Further, by providing the gauge on the base 10, the operator can easily view the dial plate. A gauge of this type is one which may be adapted for various purposes and easily and particularly quickly operated.

What we claim is:

1. A gauge of the class described, comprising: an elongated vertically directed bar; a shaft having a helically extended groove formed in its periphery and journaled in parallel relation with said bar; a carriage having an opening formed therethrough and said bar being projected through said opening and said carriage being manually movable longitudinally of said bar; an arm mounted on the lower end of said carriage and projecting outwardly therefrom and having an opening formed therethrough through which said shaft projects; a pin carried by said arm and projecting into said opening and engaging in the groove in said shaft; an arm projecting outwardly from the opposite side of said carriage at the lower end thereof and adapted for supporting a work-engaging tool, said shaft being rotatable upon longitudinal movement of said carriage on said bar; threaded means carried by said carriage and engageable with said bar for locking said carriage in fixed relation on said bar; a collar slidably mounted on said bar; threaded means connecting said collar to said carriage; and means rotatable for rotating said threaded means and adjusting relative positions of said bar and said carriage; and threaded means carried by said collar and engageable with said bar for locking said collar on said bar; and an indicating mechanism, said shaft extending into said indicating mechanism and adapted upon rotation for operating said indicating mechanism.

2. A gauge of the class described, comprising: an elongated vertically directed bar; a shaft having a helically extended groove formed in its periphery and journaled in parallel relation with said bar; a carriage having an opening formed therethrough and said bar being projected through said opening and said carriage being manually movable longitudinally of said bar; an arm mounted on the lower end of said carriage and projecting outwardly therefrom and having an opening formed therethrough which said shaft projects; a pin carried by said arm and projecting into said opening and engaging in the groove in said shaft; an arm projecting outwardly from the opposite side of said carriage at the lower end thereof and adapted for supporting a work-engaging tool, said shaft being rotatable upon longitudinal movement of said carriage on said bar; threaded means carried by said carriage and engageable with said bar for locking said carriage in fixed relation on said bar; and an indicating mechanism, said shaft extending into said indicating mechanism and adapted upon rotation for operating said indicating mechanism.

JOSEPH BAUER.
ANTHONY SCHITTELBAUER.

REFERENCES CITED

The following references are of record in the file of this patent:

UNITED STATES PATENTS

| Number | Name | Date |
|---|---|---|
| 762,575 | Bray | June 14, 1904 |
| 1,786,339 | Ford | Dec. 23, 1930 |
| 1,824,153 | Jacobs | Sept. 22, 1931 |
| 1,898,552 | MacLaren | Feb. 21, 1933 |
| 1,964,168 | Lowe | June 26, 1934 |
| 2,256,030 | Lipani | Sept. 16, 1941 |

FOREIGN PATENTS

| Number | Country | Date |
|---|---|---|
| 238,280 | Switzerland | Oct. 16, 1945 |